United States Patent
Jen

(10) Patent No.: US 8,945,695 B2
(45) Date of Patent: Feb. 3, 2015

(54) POLYETHYLENE TEREPHTHALATE RESIN SYNTHESIZED INORGANIC TI—MG CATALYST AND ITS APPLICATIONS THEREOF

(75) Inventor: Zo-Chun Jen, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 1177 days.

(21) Appl. No.: 12/222,401

(22) Filed: Aug. 8, 2008

(65) Prior Publication Data

US 2009/0280279 A1   Nov. 12, 2009

(30) Foreign Application Priority Data

May 6, 2008   (TW) .............................. 97116585 A

(51) Int. Cl.
| | | |
|---|---|---|
| *B32B 1/02* | (2006.01) | |
| *C08G 63/00* | (2006.01) | |
| *C08G 63/80* | (2006.01) | |
| *C08G 63/85* | (2006.01) | |
| *C08G 63/185* | (2006.01) | |
| *B65D 1/02* | (2006.01) | |
| *C08G 63/183* | (2006.01) | |
| *C08G 63/692* | (2006.01) | |
| *C08G 63/87* | (2006.01) | |
| *C08K 3/22* | (2006.01) | |
| *C08K 5/00* | (2006.01) | |

(52) U.S. Cl.
CPC .............. *C08G 63/80* (2013.01); *C08G 63/85* (2013.01); *C08G 63/185* (2013.01); *B65D 1/0207* (2013.01); *C08G 63/183* (2013.01); *C08G 63/692* (2013.01); *C08G 63/87* (2013.01); *C08K 3/22* (2013.01); *C08K 5/0041* (2013.01)

USPC ....... 428/36.4; 428/542.8; 528/279; 528/286; 528/308.1

(58) Field of Classification Search
CPC .... C08G 63/85; C08G 63/183; C08G 63/692; B65D 1/0207
USPC ................. 428/34.1, 34.4, 35.7, 36.4, 36.92, 428/542.8; 528/279, 272, 286, 308.1
See application file for complete search history.

(56) References Cited

U.S. PATENT DOCUMENTS

| | | | |
|---|---|---|---|
| 5,656,716 A * | 8/1997 | Schmidt et al. ............... | 528/279 |
| 5,922,828 A | 7/1999 | Schiraldi | |
| 6,013,756 A | 1/2000 | Hagen et al. | |
| 6,022,920 A * | 2/2000 | Maxwell et al. .............. | 524/431 |
| 6,451,959 B1 * | 9/2002 | Ohmatsuzawa et al. ...... | 528/279 |
| 6,489,433 B2 | 12/2002 | Duan et al. | |
| 6,500,915 B1 | 12/2002 | Fujimori et al. | |
| 6,541,598 B2 | 4/2003 | Duan et al. | |
| 6,593,447 B1 | 7/2003 | Yamamoto | |
| 6,667,383 B2 | 12/2003 | Fujimori et al. | |
| 7,094,863 B2 | 8/2006 | Moore et al. | |
| 7,129,317 B2 | 10/2006 | Moore et al. | |
| 7,300,998 B2 | 11/2007 | Hori et al. | |
| 8,039,416 B2 * | 10/2011 | Higashijima et al. ......... | 502/309 |

* cited by examiner

*Primary Examiner* — Walter B Aughenbaugh
(74) *Attorney, Agent, or Firm* — Bacon & Thomas, PLLC

(57) ABSTRACT

PET resins containing a small amount of a blue dye and/or further containing inorganic particles of $Fe_3O_4$ or $BaSO_4$ are synthesized in the presence of an inorganic Ti—Mg catalyst employed as a polycondensation catalyst and a phosphorus stabilizer during a polycondensation process, and the resultant PET resins are free of yellowish appearance and reduced regenerated acetaldehyde and cyclic oligomers after processed so that PET bottle preforms if made of the PET resins can facilitate reduction in aging time thereby to improve the product yield of the bottle preforms and to save the stock space for storing the bottle preforms.

11 Claims, No Drawings

POLYETHYLENE TEREPHTHALATE RESIN SYNTHESIZED INORGANIC TI—MG CATALYST AND ITS APPLICATIONS THEREOF

BACKGROUND OF THE PRESENT INVENTION

1. Field of the Present Invention

The present invention relates to a polyethylene terephthalate resin, and more particularly, to a polyethylene terephthalate resin containing a small amount of blue dye and inorganic particles and synthesized by using an inorganic Ti—Mg catalyst as a polycondensation catalyst.

2. Description of Prior Art

A conventional process for producing polyethylene terephthalate (PET) is to react purified terephthalic acid (TA) and ethylene glycol (EG) by a direct esterification reaction to yield bis(2-hydroxyethyl) terephthalate (i.e., monomer) and oligomers and water. This reaction is reversible and thus can be carried to completion by removing the water during the direct esterification process. The direct esterification process does not require a catalyst and conventionally no catalyst is employed.

The monomer then undergoes a polycondensation process to form PET. The polycondensation process typically uses antimony as a polycondensation catalyst. If necessary, a solid-state polymerization process may optionally follow the polycondensation process to increase the molecular weight of the resultant PET resins.

Recently, PET bottles have dominated over in drink-packaging applications and have almost replaced all kinds of glass bottles and aluminum cans. However, trace migration of antimony (Sb) from a PET bottle is capable of migrating into the drink contained therein, and it has been proven that the heavy metal, e.g. antimony (Sb), has seriously threatened to human health.

For solving this problem mentioned above, the process for producing polyethylene terephthalate (PET) have been taught to use an organic titanium-containing catalyst to replace the antimony (Sb) catalyst as a polycondensation catalyst during the polycondensation process to form the PET. However, to take the titanium-containing catalyst used as a polycondensation catalyst still has some defects which include the finished PET looks yellowish and susceptible to thermal degradation resulted in disadvantageously bringing relatively high concentration of acetaldehyde and cyclic oligomer in the PET. Therein, the problem of the finished PET looking yellowish is difficult to remedy even by adding dyes during the polycondensation process of manufacturing PET.

For example, U.S. Pat. No. 5,922,828 employs an organic tetrabutyltitanate (also known as TBT) as a titanium-containing catalyst and employs bis(2,4-di-tert-butylphenyl) pentaerythritol diphosphite (commercially named as Anti-Oxidant AT-626) as a stabilizer to reduce acetaldehyde concentration in the synthesized polymer. Nevertheless, this prior art still fails to overcome the problem of the finished PET looking yellowish.

U.S. Pat. No. 6,013,756 uses an organic tetrabutyl titanate compound as a titanium-containing catalyst during the polycondensation process of manufacturing PET and utilizes by addition of cobalt acetate to eliminate the defective yellowish appearance of the PET.

The embodiments disclosed in U.S. Pat. No. 6,500,915 also involves in using tetrabutyltitanate (TBT), phosphide and magnesium acetate to synthesize PET. However, this prior art provides no solution for elimination of the defective yellowish appearance of PET synthesized in the presence of the titanium-containing catalyst.

U.S. Pat. No. 6,593,447 has disclosed a polycondensation catalyst. For making the polycondensation catalyst organic titanium and phosphorous compounds are mixed in a certain proportion and dissolved in glycol to prepare a catalyst solution. The catalyst solution then reacts with anhydride under 200° C. to produce the polycondensation catalyst. However, this prior art provides no solution for elimination of the defective yellowish appearance of PET synthesized in the presence of titanium-containing catalyst.

U.S. Pat. No. 6,667,383 relates to PET synthesized in the presence of tetrabutyltitanate (TBT), phosphate esters and magnesium compounds. Yet, this prior art provides no solution for elimination of the defective yellowish appearance of PET synthesized in the presence of titanium-containing catalyst.

U.S. Pat. Nos. 6,489,433 and 6,541,598 respectively employ organic tetrabutyltitanate (TBT) or organic tetraisopropyl titanate as the polycondensation catalyst and additionally use a phosphonate ester to synthesize PET with desired color.

U.S. Pat. Nos. 7,094,863 and 7,129,317 use organic titanium diisopropoxide bis(acetyl-acetonate) or organic tetrabutyltitanate (TBT) as the polycondensation catalyst to synthesize PET. Bottle preforms made thereof provides with specific features of being bright and highly transparent and having low concentration of metal elements therein. Hot-filling bottles formed from such bottle preforms still maintain excellent transparency and desired dimensional stability at a filling temperature ranging from 195 to 205° F.

U.S. Pat. No. 6,451,959 teaches a solid titanium compound T that is prepared by hydrolyzing a titanium halide to obtain a hydrolyzate and then dehydro-drying the hydrolyzate. According to the cited prior art, the solid titanium compound T may be combined with other compounds E, such as Be-hydroxide, Mg-hydroxide, Ca-hydroxide, Sr-hydroxide or Ba-hydroxide. Therein, E/Ti molar ratio is between 1/50 and 50/1 while OH/Ti molar ratio is between 0.09 and 4.

U.S. Pat. No. 7,300,998 relates to a polycondensation catalyst applicable to synthesis of PET used for making bottles. Therein, $Mg(OH)_2$ and $TiCl_4$ are mixed in water to form an aqueous solution. Ammonia water is then added therein drop by drop to adjust the aqueous solution to about pH 9. Successively, an aqueous acetic acid solution is added therein drop by drop to adjust the aqueous solution to about pH 5. After filtering, washing and dissolving in ethylene glycol, the solution is treated by a centrifuge to have solid therein separated. The solid is then dried in vacuum at 40° C. for 20 hours before being ground into powders sized between 10 and 20 μm. The powders are afterward mixed with an ethylene glycol solution containing sodium hydroxide so as to obtain the polycondensation catalyst for use in synthesis of PET bottles. By using the sodium hydroxide, the cited prior art provides a polyester having high solid-state polycondensation rate and low concentration of regenerated acetaldehyde. However, this prior art provides no solution for elimination of the defective yellowish appearance of PET synthesized in the presence of titanium-containing catalyst.

Another known prior art is also to take a novel titanium-containing catalyst used as a polycondensation catalyst, while the titanium-containing catalyst is produced by reacting an aqueous $MgCl_2$ solution with an aqueous NaOH solution at 170° C. for 30 minutes approximately, and the reacted solution is then filtered and washed to form an aqueous $Mg(OH)_2$ slurry. On the other hand, an aqueous $TiCl_4$ solution and an aqueous NaOH solution are mixed before being added into the $Mg(OH)_2$ slurry. After the mixed aqueous $TiCl_4$ and NaOH solution added drop by drop into the $Mg(OH)_2$ slurry, the mixture is stirred for one hour for aging until $TiO_2$ embraces on the outer surface of $Mg(OH)_2$ in the slurry. Afterward, the slurry is filtered and washed to get solid part therein. The solid is dried and pulverized into powders that are later mixed with ethylene glycol to form a solution for use in polycondensation. As a result, both the reaction rate of the titanium-containing catalyst and the color of the polyester synthesized in the presence of the titanium-containing catalyst are similar to those of Antimony trioxide ($Sb_2O_3$).

In addition to the prior arts mentioned above, bottle preforms if made of PET synthesized in the presence of titanium catalysts and before capable of being blown into finished bottles require longer extended aging time than that of the bottle preforms if made of PET synthesized in the presence of antimony catalysts, otherwise, the bottle preforms synthesized in the presence of titanium catalysts if insufficient extended aging time will be inferior in dimensional stability and susceptible to shrinkage and deformation. In addition, insufficient extended aging time results in relatively low cyrstallinity of hot filled bottles made from heat-setted process, and accounts for relatively low hot filled temperature of filled bottles produced in the presence of titanium catalysts compared to filled bottles produced in the presence of antimony catalysts.

SUMMARY OF THE INVENTION

The primary objective of the present invention is to provide PET resins containing a small amount of a blue dye or further containing inorganic particles. The PET resins are synthesized in the presence of an inorganic Ti—Mg catalyst employed as a polycondensation catalyst and a proper amount of a phosphorus stabilizer during the polycondensation process so that the resultant PET resins are free of yellowish appearance and provided with much reduced regenerated acetaldehyde and cyclic oligomers after processed.

Another objective of the present invention is to provide a process of for producing PET resins comprising using purified terephthalic acid and ethylene glycol to conduct a direct esterification process and a polycondensation process successively, and if necessary further conduct a solid-state polymerization process, to increase intrinsic viscosity of the compound to 0.70 dl/g or more. Before the end of the direct esterification process a blue dye with an amount less than 3 ppm based on the total PET resin weight is added, and before the beginning of the polycondensation process, an inorganic Ti—Mg catalyst and a phosphorus compound are added into the reaction tank where the direct esterification process takes place. Wherein the amount of inorganic Ti—Mg catalyst added ranges from 10 to 100 ppm based on the total PET resin weight, and the amount of titanium added ranges from 5 to 10 ppm based on the total PET resin weigh, and wherein the molar ratio between the added titanium and magnesium ranges from 0.005 to 1, and the added phosphorus compound contains an amount of phosphorus ranging from 5 to 50 ppm based on the total PET resin weigh. Alternatively, inorganic particles of $Fe_3O_4$ or $BaSO_4$ are introduced during the polycondensation process with an amount ranging from 20 to 250 ppm based on the total PET resin weight.

Further another objective of the present invention is that the PET resins synthesized in the present invention, containing a small amount of the blue dye or further containing the inorganic particles, are fit to make PET bottle preforms and facilitate reduction in the required aging time of the bottle preforms, thereby improving efficiency of production of PET bottles and saving stock space for storing the bottle preforms.

DETAILED DESCRIPTION OF THE PREFERRED EMBODIMENT

The process for producing polyethylene terephthalate (PET) of the present invention includes two steps, namely: (1) a direct esterification process and (2) a polycondensation process. If necessary, a solid-state polymerization process may be further employed to increase intrinsic viscosity (IV) of the PET to 0.70 dl/g or more.

In the present invention, no catalyst system is employed in the direct esterification process, but a blue dye is added before the end of the direct esterification process.

And, an inorganic titanium-magnesium-containing catalyst (hereinafter abbreviated as inorganic Ti—Mg catalyst) is employed as a polycondensation catalyst while a phosphorus compound is used as a thermal stabilizer during the polycondensation process, and the inorganic Ti—Mg catalyst and the phosphorus compound are added before the beginning of the polycondensation process.

Another embodiment to form the PET of the present invention is that inorganic particles are further added during the polycondensation process so that the produced PET of the present invention further contains the inorganic particles.

The practical process for producing the PET of the present invention is described as follows.

Purified terephthalic acid (PTA) and ethylene glycol (EG) are prepared in form of slurries and continuously pumped to an esterification tank where the first-stage direct esterification process takes place. The esterification process is performed at a material temperature ranging from 240° C. to 270° C., preferably from 250° C. to 260° C., under a processing pressure ranging from the atmospheric pressure to 2.0 $Kg/cm^2$, preferably from 0.01 $Kg/cm^2$ to 1.0 $Kg/cm^2$, and for a reaction duration ranging from 3 to 8 hours, preferably from 4 to 6 hours.

Furthermore, a monomer conversion rate at the exit of the esterification tank is greater than 92%, preferably greater than 95%. The vapor state of ethylene glycol and water generated during the direct esterification process are led to a distillation column through a vaporization pipe for separation and then the ethylene glycol collected at the bottom stream of the distillation column is refluxed to the esterification tank.

Afterward, the monomer produced in the aforesaid esterification process is continuously pumped to a pre-polycondensation reactor to undergo the pre-polycondensation reaction. The pre-polycondensation reactor may comprise one vessel or two vessels. The pre-polycondensation process is performed at a material temperature ranging from 260° C. to 280° C., preferably from 250° C. to 260° C. under a processing pressure ranging from 10 mmHg to 200 mmHg. The by-products of vapor such as ethylene glycol generated during the pre-polycondensation process are condensed into a liquid. The residence time for the pre-polycondensation is between 0.5 hour and 2 hours.

The product produced from the pre-polycondensation process, is continuously pumped to a high vacuum finisher to undergo a further polycondensation reaction, so that the intrinsic viscosity is increased to at least 0.50 dl/g. The high vacuum finisher may comprise one vessel or two vessels of either a cage type or a disc type. The material temperature in the high vacuum finisher is from 265° C. to 290° C., preferably lower than 285° C. In the finisher, a multi-stage ejector is employed to keep the vacuum pressure below 2 mmHg while the actually applied vacuum pressure is subject to the feedback control of the viscosity of the finished polymer.

The resultant polymer produced from the polycondensation process in the finisher is continuously withdrawn by a pump to a die head to be extruded and the extruded polymers are immediately cooled in chilled water and then are cut into amorphous chips by a cutter.

The inorganic Ti—Mg catalyst of the present invention is used as a polycondensation catalyst during the polycondensation process to form the PET resin, which is synthesized by chemical precipitation as described below:

(1) $TiCl_4$ is dissolved in deionized water and then undergoes a hydrolysis process in an ice water bath to form an aqueous hydrolyzate solution;
(2) The aqueous hydrolyzate solution and an aqueous $MgCl_2$ solution are mixed at a predetermined Ti/Mg molar ratio at room temperature;
(3) Afterward, an aqueous NaOH solution is slowly added into the constantly stirred Ti—Mg mixture to form a kind of slurry containing a white precipitate;
(4) The slurry is then washed with deionized water, filtered and vacuum dried at 100° C.;
(5) The dried product is further pulverized into powders sized under 1 μm; and
(6) The resultant powders are mixed with ethylene glycol to produce a catalyst solution, namely the inorganic Ti—Mg catalyst used in the present invention.

The inorganic Ti—Mg catalyst used in the present invention has a particle diameter smaller than 1 μm, wherein the molar ratio between the added titanium and magnesium (hereinafter abbreviated as Ti/Mg molar ratio) is about from 0.005 to 1, preferably from 0.1 to 0.2.

In the synthesis process for producing of the PET resins of the invention, the amount of the inorganic Ti—Mg catalyst added in the polycondensation process ranges from 10 ppm to 100 ppm based on the total PET resin weight. The amount of titanium added ranges from 5 ppm to 10 ppm based on the total PET resin weight. The concentration of the catalyst solution made of Ti—Mg catalyst and ethylene glycol is between 0.01% and 15%.

The phosphorous compound employed in the present invention may be any one selected from phosphoric acid, phosphorous acid, and various phosphorous esters. In the synthesis process of the disclosed PET, the phosphorous compound is added at an amount ranging from 5 ppm to 50 ppm, preferably from 10 ppm to 30 ppm, based on the total PET resin weight.

The inorganic particles used in the present invention are those inorganic particles of $Fe_3O_4$ or $BaSO_4$ with a particle diameter smaller than 1 μm. In the synthesis process of the PET disclosed in the present invention, the inorganic particles are added at an amount ranging from 20 to 250 ppm, preferably from 25 to 50 ppm, based on the total PET resin weight.

For preventing the PET resin of the present invention from being apt to yellow color, a dye is optionally used for reducing Hunter's "b" value of the PET that is measured by a Hunter calorimeter. The dye can be a blue dye, such as C.I. Solvent Blue 104. The amount of the blue dye added is less than 3 ppm, preferably less than 2 ppm, and more preferably less than 1 ppm, based on the total PET weight.

On the other hand, for preventing Hunter's "a" value of the PET resin measured by the same Hunter colorimeter from being low (lower Hunter's "a" value means that the PET look greenish), a small amount of a red dye may be added as needed. However, the red dye decreases Hunter's "L" value of the PET resin and renders the PET resin darkish.

In the synthesis process of the PET disclosed in the present invention, the device for use in the solid-state polymerization process can be a continuous polymerizing apparatus such as one provided by Swiss Buhler, Italian Sinco or American Bepex. By using the continuous polymerizing apparatus, the amorphous PET produced in the second-stage polycondensation process can be further increased in the molecular weight thereof up to at least 0.70 dl/g, preferably between 0.72 and 0.86 dl/g.

The PET resin of the present invention are used in manufacturing PET hot-filling bottles by a conventional one-stage bottle making method or two-stage bottle making method.

In the case where the one-stage bottle making method is adopted, the PET resins are directly melt in a PET stretch blow molding machine at a melting temperature ranging from 270° C. to 295° C. and made into bottle preforms. After a short cooling time, the bottle preforms can be stretched blown into PET hot-filling bottles directly.

In the case where the two-stage bottle making method is adopted, an injection blow molding machine is employed to make the PET resins into bottle preforms at a melting temperature ranging from 270° C. to 290° C. The preforms, after aging for days, are heated by near infrared lamps to temperature above the glass transition temperature thereof and blown into PET filling bottles.

Moreover, the PET resin of the present invention has some special features as follows:

(1) The PET resins of the present invention, synthesized in the presence of the inorganic Ti—Mg catalyst created by the invention during the polycondensation process, have significantly provided with a lower Hunter's "b" value (measured by a Hunter colorimeter) than that of the known PET resin synthesized in the presence of an organic titanium catalyst.
(2) The known PET resins are usually synthesized in the presence of an organic titanium catalyst and a thermal stabilizer of phosphoric acid during the polycondensation process, while it has been learned by experiment that the activity of the organic titanium catalyst is significantly suppressed by the phosphoric acid.

Oppositely, the PET resins of the present invention are synthesized in the presence of the inorganic Ti—Mg catalyst and a thermal stabilizer of phosphoric acid during the polycondensation process, while through experiment it has been found by the applicant that the activity of the inorganic Ti—Mg catalyst is not significantly suppressed by the phosphoric acid. As a result, the PET bottles if made from the PET resin of the present invention contain less acetaldehyde than that of bottles made from the known PET resins mentioned above.

(3) The PET resins of the present invention, if synthesized by adding with a certain amount of dyes and in the presence of the inorganic Ti—Mg catalyst created by the invention during the polycondensation process, presents a color tune obviously superior to that of the known PET resins synthesized by adding with the same amount of the dyes and in the presence of the organic titanium catalyst.

Consequently, it is has been proven that the PET resins of the present invention may contain less amount of blue dye than that of the known PET resins have. So that the PET resins of the present invention has a relatively higher Hunter's "L" value measured by a Hunter calorimeter. In particular, the PET bottles made from the PET resin of the present invention look relatively much brighter in appearance.

(4) The bottle performs, if made from the PET resins further containing inorganic particles of $Fe_3O_4$ or $BaSO_4$ of the present invention, require a much shorter aging time than that of bottle performs made from the PET resins contained no inorganic particles required.

Generally, bottle preforms made from the known PET resins synthesized in the presence of an organic titanium catalyst have to wait for 5 or 7 days before being blown into bottles, otherwise the bottles tend to suffer from inferior dimensional stability. And, if a hot-filling bottle, whose bottle neck should be crystallized and turned white, is blown from a bottle preform under aging time being not sufficiently enough aging, the hot-filling bottle shall tend to have lower bottle neck crystallinity. As a result, the hot-filling bottle shall be so easily deformed in a later hot-filling process which resulting in rendering a defective seal between a cap and the hot-filling bottle and thus significantly reducing the shelf life of a drink contained in the hot-filling bottle.

Oppositely, bottle preforms made from the PET resins of the invention only require a reduced aging time as short as 5 days, or even less than 3 days.

The following embodiments and comparative example are provided for illustrating and demonstrating the effects of the present invention, it is to be noted that the scope of the present invention is not limited to the recited embodiments.

Acetaldehyde Concentration Analysis:

Preforms made by injection are frozen in liquid nitrogen and then pulverized into powders. The powders are received in a cell that is sealed with a septum cap, and then the cell is treated by a heating process at 150° C. for 30 minutes. Afterward, gas in the cell is drawn by a sampling probe piercing the cap, and then the sampling probe feeds the gas sample to a gas chromatograph system for analyses.

Cyclic Trimer Analysis:

A hexafluoride isopropyl alcohol solvent is used to dissolve the precisely weighted PET resins and prepare a limpid solution. The limpid solution is filtered in vacuum and the clear filtrate is then dried by evaporation to obtain a cyclic oligomer in the form of white crystals.

The white crystals are further dissolved in dioxane (or known as diethylene dioxide) to obtain another limpid solution. The latter limpid solution is introduced into a high-performance liquid chromatography system (HPLC) for LC analyses.

Preform Aging Time Test:

A plurality of bottle preforms made of the PET of the invention are laid aside for aging for 1 day, 2 days, 3 days, 4 days, 5 days, 6 days and 7 days, respectively. Afterward, bottle necks of the bottles are treated by near infrared lamps to be heated to about 160° C. After lasting the near infrared heat for 3 minutes, the bottle necks turn white. Then the whitened bottle necks are removed from the bottles to be analyzed by Column Gradient Density to determine the crystallinity thereof.

The aging period is recorded while whose crystallinity of the whitened bottle necks goes beyond 35%.

EXAMPLE 1

A BHET monomer of 88% esterification rate taken from a continuous melt polymerization line is weighted and 10.81 Kg of such BHET monomer is added with 3.23 Kg of EG and 0.6 g of phosphoric acid (i.e., 60 ppm of phosphoric acid). The resultant mixture is heated above 190° C. to realize an esterification reaction with a stirrer rotation rate at 60 rpm, under a reaction pressure of about 1 Kg/cm$^2$ for 2 hours. At the end of the esterification reaction, the mixture is at about 240° C. with an esterification rate over 95%.

After the esterification reaction, an inorganic Ti—Mg catalyst dissolved in ethylene glycol is added. In the inorganic Ti—Mg catalyst, the Ti/Mg molar ratio is 0.25 while the added amount of titanium is 5 ppm of the PET. Additionally, both a blue dye dissolved in ethylene glycol and a red dye dissolved in ethylene glycol are also added at amounts of 2.0 ppm and 0.7 ppm of the PET, respectively. The esterified monomer then goes through a pre-polymerization process in vacuum. During the process that takes one hour, the reaction pressure is gradually reduced from 760 torr to torr and the reaction temperature is between 240° C. and 255° C. Subsequently, a polymerization process is conducted in a high-vacuum environment where the reaction pressure is lower than 1 torr and the reaction temperature is gradually increased from 255° C. With the increase of the reaction temperature, the viscosity of the polymer is increased accordingly so that under a constant torque of the stirrer, the rotation rate of the stirrer is gradually reduced to about 25 rpm. The temperature of the polymer at the end of the process is 280.7° C. The polymer is rapidly chilled and cut into amorphous chips. After analyses, it is learned that the intrinsic viscosity IV thereof is 0.613 dl/g, and the reaction time is 82 minutes. The resins are then put into a taper vacuum solid-state polymerization tank to receive a solid-state polymerization process, thereby increasing the IV value up to 0.724 dl/g.

The processed resins are then used to make bottle preforms by injection and blowing. The produced resins, solid-state polymerization resins and bottle preforms are analyzed and the detailed results are listed in Table 1.

EXAMPLE 2

PET resins in Example 2 are made by a method similar to that described in Example 1. In Example 2, the blue dye of an amount of 1.1 ppm of the PET resins is added. When heated to 275.0° C., the polymer is rapidly chilled and cut into amorphous resins. After analyses, it is learned that the intrinsic viscosity IV thereof is 0.538 dl/g, and the reaction time is 90 minutes. Then the resins are treated in a solid-state polymerization process such that its intrinsic viscosity increases to 0.74 dl/g.

Bottle preforms are made from the resins by injection and blowing. The produced resins, solid-state polymerization resins and bottle preforms are analyzed and the detailed results are listed in Table 1.

EXAMPLE 3

PET resins in Example 3 are made by a method similar to that described in Example 1. In Example 3, the blue dye of an amount of 0.9 ppm of the PET resins and the red dye of an amount of 0.6 ppm of the PET resins are added respectively. When heated to 281.1° C., the polymer is rapidly chilled and cut into amorphous resins. After analyses, it is learned that the intrinsic viscosity IV thereof is 0.607 dl/g, and the reaction time is 81 minutes. Then the resins are treated in a solid-state polymerization process such that its intrinsic viscosity increases to 0.73 dl/g.

Bottle preforms are made from the resins by injection and blowing. The produced resins, solid-state polymerization resins and bottle preforms are analyzed and the detailed results are listed in Table 1.

EXAMPLE 4

PET resins in Example 4 are made by a method similar to that described in Example 3. In Example 4, in addition to the blue dye and the red dye, inorganic particles of $Fe_3O_4$ in an amount of 25 ppm of the PET resins are added. When heated to 280.1° C., the polymer is rapidly chilled and cut into amorphous resins. After analyses, it is learned that the intrinsic viscosity IV thereof is 0.610 dl/g, and the reaction time is 80 minutes. Then the resins are treated in a solid-state polymerization process such that its intrinsic viscosity increases to 0.72 dl/g.

Bottle preforms are made from the resins by injection and blowing. The produced resins, solid-state polymerization resins and bottle preforms are analyzed and the detailed results are listed in Table 1.

EXAMPLE 5

PET resins in Example 5 are made by a method similar to that described in Example 4. In Example 5, inorganic particles of $Fe_3O_4$ in an amount of 50 ppm of the PET resins are added. When heated to 280.0° C., the polymer is rapidly chilled and cut into amorphous resins. After analyses, it is learned that the intrinsic viscosity IV thereof is 0.608 dl/g, and the reaction time is 81 minutes. Then the resins are treated in a solid-state polymerization process such that its intrinsic viscosity increases to 0.71 dl/g.

Bottle preforms are made from the resins by injection and blowing. The produced resins, solid-state polymerization resins and bottle preforms are analyzed and the detailed results are listed in Table 1.

EXAMPLE 6

PET resins in Example 6 are made by a method similar to that described in Example 4. In Example 6, no red dye is added, but blue dye in an amount of 0.5 ppm and inorganic particles of $Fe_3O_4$ in an amount of 250 ppm of the PET resins are added. When heated to 279.8° C., the polymer is rapidly chilled and cut into amorphous resins. After analyses, it is learned that the intrinsic viscosity IV thereof is 0.605 dl/g, and the reaction time is 81 minutes. Then the resins are treated in a solid-state polymerization process to make its intrinsic viscosity increase to 0.72 dl/g.

Bottle preforms are made from the resins by injection and blowing. The produced resins, solid-state polymerization resins and bottle preforms are analyzed and the detailed results are listed in Table 1.

EXAMPLE 7

PET resins in Example 7 are made by a method similar to that described in Example 2. In Example 7, the inorganic Ti—Mg catalyst is such added that titanium is 10 ppm of the PET resins. The resins are treated in a solid-state polymerization process such that its intrinsic viscosity increases to 0.76 dl/g.

Bottle preforms are made from the resins by injection and blowing. The produced resins, solid-state polymerization resins and bottle preforms are analyzed and the detailed results are listed in Table 1.

COMPARATIVE EXAMPLE 1

PET resins in Comparative Example 1 are made by a method similar to that described in Example 1. In Comparative Example 1, an organic tetrabutyltitanate (TBT) catalyst is used instead of the inorganic Ti—Mg catalyst and triethyl phosphate (TEP) is added as a stabilizer. The resins are treated in a solid-state polymerization process such that its intrinsic viscosity increases to 0.72 dl/g.

Bottle preforms are made from the resins by injection and blowing. The produced resins, solid-state polymerization resins and bottle preforms are analyzed and the detailed results are listed in Table 1.

COMPARATIVE EXAMPLE 2

PET resins in Comparative Example 2 are made by a method similar to that described in Example 2. In Comparative Example 2, an organic tetrabutyltitanate (TBT) catalyst is used instead of the inorganic Ti—Mg catalyst and triethyl phosphate (TEP) is added as a stabilizer. The resins are treated in a solid-state polymerization process such that its intrinsic viscosity increases to 0.72 dl/g.

Bottle preforms are made from the resins by injection and blowing. The produced resins, solid-state polymerization resins and bottle preforms are analyzed and the detailed results are listed in Table 1.

COMPARATIVE EXAMPLE 3

PET resins in Comparative Example 3 are made by a method similar to that described in Example 2. In Comparative Example 3, an organic tetrabutyltitanate (TBT) catalyst is used instead of the inorganic Ti—Mg catalyst and phosphoric acid is added as a stabilizer. The resins are treated in a solid-state polymerization process such that its intrinsic viscosity increases to 0.67 dl/g.

Bottle preforms are made from the resins by injection and blowing. The produced resins, solid-state polymerization resins and bottle preforms are analyzed and the detailed results are listed in Table 1.

Conclusion

The following conclusions are drawn through the results of Examples 1-7 and Comparative Examples 1-3, as shown in Table 1:

(1) The PET resins of Examples 1-7 contain a small amount of a blue dye and, in the synthesis process of the PET, an inorganic Ti—Mg catalyst used as a polycondensation catalyst and phosphoric acid are also added as a thermal stabilizer. The resultant PET is characterized by not being yellowish, having excellent transparency and producing less regenerated acetaldehyde and cyclic trimer after processed.

(2) The PET resins of Examples 4-6 further contain inorganic particles of $Fe_3O_4$ that substantially contribute to a relatively high crystallinity when the PET resins are blown into bottle preforms by a stretch blow molding machine. Therefore, the PET resins of Examples 4-6, when being made into bottle preforms, are advantageous by requiring less aging time of the preforms, improving productive efficiency of bottle manufacture and saving stock space for storing the preforms.

(3) The PET resins of Example 5 contain inorganic particles of Fe3O4 in an amount of 50 ppm of the PET resins, when the PET resins are made into bottle preforms by a stretch blow molding machine, the preforms require only 2 days for aging before being heated, and stretched and blown into finished bottles.

TABLE 1

| Item | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|
| Polycondensation Catalyst | Inorganic Ti—Mg | Inorganic Ti—Mg | Inorganic Ti—Mg | Inorganic Ti—Mg | Inorganic Ti—Mg | Inorganic Ti—Mg | Inorganic Ti—Mg | Organic TBT[1] | Organic TBT[1] | Organic TBT[1] |
| Titanium Concentration | 5 ppm | 5 ppm | 5 ppm | 5 ppm | 5 ppm | 5 ppm | 10 ppm | 6 ppm | 6 ppm | 6 ppm |
| Thermal stabilizer Concentration | Phosphoric Acid 60 ppm | Phosphoric Acid 60 ppm | Phosphoric Acid 60 ppm | Phosphoric Acid 60 ppm | Phosphoric Acid 60 ppm | Phosphoric Acid 60 ppm | Phosphoric Acid 60 ppm | TEP[2] 60 ppm | TEP[2] 60 ppm | Phosphoric Acid 60 ppm |
| Blue Dye Concentration (ppm) | 2.0 | 1.1 | 0.9 | 0.9 | 0.9 | 0.5 | 1.1 | 2.0 | 1.1 | 1.1 |
| Red Dye Concentration (ppm) | 0.7 | 0.7 | 0.6 | 0.6 | 0.6 | 0 | 0.7 | 0.7 | 0.7 | 0.7 |
| Inorganic Particle (ppm) | 0 | 0 | 0 | $Fe_3O_4$ 25 ppm | $Fe_3O_4$ 50 ppm | $Fe_3O_4$ 250 ppm | 0 | 0 | 0 | 0 |
| Melt Polymerization Conclusion Temp. (° C.) | 280.7 | 275.0 | 281.1 | 280.1 | 280.0 | 279.8 | 275.1 | 280.6 | 274.1 | 280.5 |
| Resin IV (dl/g) | 0.613 | 0.538 | 0.607 | 0.610 | 0.608 | 0.605 | 0.587 | 0.584 | 0.524 | 0.555 |
| Reaction Time (min) | 82 | 90 | 81 | 80 | 81 | 81 | 67 | 81 | 77 | 101 |
| Resin Color "L" value[3] | 61.7 | 62.9 | 65.6 | 61.1 | 64.0 | 56.5 | 62.1 | 63.0 | 63.5 | 62.5 |
| Resin Color "b" Value[3] | 1.0 | 1.7 | 2.1 | 1.5 | 1.7 | 2.5 | 3.3 | 5.8 | 2.9 | 7.1 |
| Solid-state Polymerization IV (dl/g) | 0.724 | 0.74 | 0.73 | 0.72 | 0.71 | 0.72 | 0.76 | 0.72 | 0.72 | 0.67 |
| Preform Cyclic Trimer (%) | 0.36 | 0.37 | 0.41 | 0.40 | 0.41 | 0.40 | 0.39 | 0.46 | 0.43 | 0.44 |
| Preform AA[4] (ppm) | 10.2 | 9.7 | 9.7 | 10.8 | 11.0 | 11.1 | 12.5 | 14.2 | 14.7 | 14.9 |
| Preform aging time (if bottle neck crystallinity ≥35%) | 7 Days | 7 Days | 7 Days | 3 Days | 2 Days | 3 Days | 7 Days | 7 Days | 7 Days | 7 Days |

Note
[1] TBT means tetrabutyltitanate.

Note
[2] TEP means Triethyl phosphate.

Note
[3] The higher Hunter's "L" value measured by a Hunter colorimeter implies the more whitish color and the higher transparency. The higher Hunter's "b" value measured by the Hunter colorimeter implies the more yellowish color while the lower Hunter's "b" value measured by the Hunter colorimeter implies the more bluish color.

Note
[4] AA means Acetaldehyde (or called acetic aldehyde) concentration in bottle preforms.

What is claimed is:

1. A polyethylene terephthalate resin containing polyethylene terephthalate (PET), a blue dye in an amount of 0.5 to 2.0 ppm based on the total PET resin weight and inorganic particles of $Fe_3O_4$ having a particle size smaller than 1 μm in an amount of ranging from 20 to 250 ppm based on the total PET resin weight, which is produced by following steps:

(a) using purified terephthalic acid (PTA) and ethylene glycol (EG) to undergo a direct esterification process and a polycondensation process successively, or selectively further to undergo a solid-state polymerization process to increase an intrinsic viscosity of the PET polymer to 0.70 dl/g or more, (b) before the end of the direct esterification process the blue dye and the inorganic particles of $Fe_3O_4$ are added into a reaction tank where the direct esterification process takes place, and (c) before the beginning of the polycondensation process an inorganic Ti—Mg catalyst having a particle size smaller than 1 μm and a phosphorus compound as a stabilizer added into the reaction tank, wherein the inorganic Ti—Mg catalyst is synthesized by chemical precipitation comprising the following steps:

(i) taking TiCl4 dissolved in deionized water and then undergoing a hydrolysis process in an ice water bath to form an aqueous hydrolyzate solution;

(ii) mixing the aqueous hydrolyzate solution with an aqueous $MgCl_2$ solution at a predetermined molar ratio (Ti/Mg) of titanium (Ti) to magnesium (Mg) at room temperature;

(iii) slowly adding an aqueous NaOH solution into the constantly stirred Ti—Mg mixture to form a kind of slurry containing a white precipitate;

(iv) washing the slurry with deionized water, and then filtered and vacuum dried at 100° C.;

(v) pulverizing the dried product into powders sized under 1 μm; and taking the resultant powders mixed with ethylene glycol to produce the inorganic Ti—Mg catalyst solution;

wherein the inorganic Ti—Mg catalyst is added in an amount of ranging from 10 to 100 ppm and the phosphorus compound is added in amount of ranging from 5 to 50 ppm based on the total PET resin weight, and wherein the titanium contained in the Ti—Mg catalyst ranges from 5 to 10 ppm based on the total PET resin weight, and the molar ratio (Ti/Mg) of titanium (Ti) to magnesium (Mg) ranges from about 0.005 to 0.25.

2. The polyethylene terephthalate resin as defined in claim 1, wherein the molar ratio (Ti/Mg) of titanium (Ti) to magnesium (Mg) ranges from about 0.1 to 0.2.

3. A bottle preform made from the polyethylene terephthalate resin of claim 1.

4. The polyethylene terephthalate resin of claim 1, wherein the molar ratio (Ti/Mg) of titanium (Ti) to magnesium (Mg) is 0.25.

5. The bottle preform of claim 3, which aging time of waiting for being stretched and blown into a bottle is 2-3 days.

6. The polyethylene terephthalate resin of claim 2, which also contains a red dye.

7. The polyethylene terephthalate resin as defined in claim 1, wherein the inorganic particles of $Fe_3O_4$ are present in an amount of from 25 to 250 ppm based on the total PET resin weight.

8. The polyethylene terephthalate resin as defined in claim 1, wherein the inorganic particles of $Fe_3O_4$ are present in an amount of 50 ppm based on the total PET resin weight.

9. The bottle preform of claim 3, wherein the polyethylene terephthalate resin contains the inorganic particles of $Fe_3O_4$ in an amount of from 25 to 250 ppm based on the total PET resin weight.

10. The bottle preform of claim 3, wherein the polyethylene terephthalate resin contains the inorganic particles of $Fe_3O_4$ in an amount of 50 ppm based on the total PET resin weight.

11. The polyethylene terephthalate resin as defined in claim 1, wherein the inorganic Ti—Mg catalyst consists of particles formed by mixing aqueous solutions of $TiCl_4$ and $MgCl_2$ followed by precipitation with aqueous sodium hydroxide to form said Ti—Mg inorganic catalyst particles.

* * * * *